United States Patent Office 3,341,616

Patented Sept. 12, 1967

3,341,616

DEHYDROHALOGENATION PROCESS AND CATALYST

Van C. Vives, Bartlesville, Okla., assignor to Phillips Petroleum Company, a corporation of Delaware No Drawing. Filed Jan. 10, 1966, Ser. No. 519,446
10 Claims. (Cl. 260—677)

This invention relates to a process for the dehydrohalogenation of organic halides. In one of its aspects, this invention relates to a process for the dehydrohalogenation of halogenated hydrocarbon compounds employing a novel catalyst comprising a borate to produce olefins wherein the formation of branched-chain olefins through isomerization is minimized. In accordance with a further aspect, this invention relates to a catalyst composition comprising an alkali metal salt of a boric acid and diatomaceous earth that is effective for dehydrohalogenating alkyl halides or producing linear olefins with high selectivity and conversion.

Currently, considerable interest and much research effort have been devoted to the production of biodegradable detergents. A proposed method comprises halogenating normal paraffins, dehydrohalogenating the resulting alkyl halides to produce olefins, alkylating benzene or other aromatics with these olefins in the presence of HF, and subsequently sulfonating the product alkylate to produce a biodegradable detergent. These produced alkyl benzene sulfonates are rapidly degraded by bacteria because of the lack of branching of the substituent alkyl groups.

It has been observed that in the production of olefins by the dehydrohalogenation of alkyl halides employing conventional dehydrohalogenation process conditions and catalyst, isomerization of the carbon skeleton of the produced olefins is the result. While, for some uses, this is not damaging, branched olefins are of little value when it is desired to form biodegradable detergents via alkylation for reasons previously stated. Furthermore, very often the temperature required with known catalysts to give adequate conversion of the halide results in considerable isomerization and/or cracking.

Accordingly, an object of this invention is to provide an improved process for the dehydrohalogenation of halogenated hydrocarbons whereby the prior art problems of isomerization and/or cracking are obviated.

Another object of this invention is to provide a process for the dehydrohalogenation of straight-chain alkyl halides to produce with a high degree of selectivity straight-chain olefins.

Another object of this invention is to provide a process for the dehydrohalogenation of alkyl halides to produce olefins wherein the formation of branched-chain olefins through isomerization is minimized.

Another object of this invention is to provide an improved dehydrohalogenation catalyst.

Other aspects, objects, as well as the several advantages of this invention will be readily apparent to those skilled in the art from a reading of this disclosure and the appended claims.

In accordance with my invention, unsaturated hydrocarbons are produced by the dehydrohalogenation of halogenated hydrocarbons over a catalyst comprising diatomaceous earth and an alkali metal borate.

In accordance with one embodiment of my invention, olefins are produced by the dehydrohalogenation of alkyl halides over a catalyst comprising diatomaceous earth and an alkali metal salt of a boric acid, i.e., an alkali metal borate. The use of this catalyst results in high conversion of the alkyl halides, with high selectivity to the desired olefins. Furthermore, little or no cracking, skeletal isomerization, or other side reaction occurs. The process of the invention is especially useful in the production of linear olefins from linear alkyl halides, for example, in the production of biodegradable detergent alkylate, in which skeletal isomerization to branched-chain olefins is especially undesirable.

Examples of representative alkali metal salts of a boric acid which can be employed according to the invention are the lithium, sodium, potassium, rubidium and cesium salts of orthoboric acid, of metaboric acid, and of tetraboric acid. The alkali metal salt can be used in an anhydrous state or as a hydrate. Acid salts containing one or more acidic hydrogens are included among the applicable alkali metal salts. Although any of the above salts can be employed according to the invention, those preferred are the sodium and potassium salts of tetraboric acid.

The alkali metal salt of the boric acid that can be employed according to the invention can be incorporated in the diatomaceous earth in any convenient manner. In a presently preferred method of preparation, the diatomaceous earth is impregnated with an aqueous solution of the desired amount of the alkali metal salt, with subsequent volatilization of the water. In some instances, it is desirable to add a mineral acid to achieve complete solution of the alkali metal salt in a minimum amount of solvent.

Although the concentration of the alkali metal salt in the diatomaceous earth can vary appreciably, the alkali metal salt will generally comprise about 0.5–30 weight percent of the catalyst, usually comprising about 1–20 weight percent of the catalyst, these concentrations being based on the alkali metal salt in its anhydrous form. The particle size of the borate-diatomaceous earth catalyst of the invention can vary over a wide range. For example, the catalyst can be in the form of pellets, granules, or finely divided particulate material. Particles smaller than 325 mesh (U.S. series) are useful, as are granules of 6 mesh or larger and granules ranging from 325 to 6 mesh. Granular material is favored for continuous fixed bed type dehydrohalogenation process reactions.

The catalysts of my invention are suitable for the dehydrohalogenation of halogenated hydrocarbons broadly, and is particularly suitable for dehydrohalogenation of halogenated alkanes, including mono- and polyhalo substituted alkanes of the straight-chain, branched-chain and cyclic type. The invention is particularly suitable to the dehydrohalogenation of straight-chain alkyl halides to produce straight-chain olefins.

The alkyl halides employed in the dehydrohalogenation process are alkyl halides, generally containing from 4 to 18 carbon atoms per molecule. The alkyl halides can be chlorides, iodides, bromides, fluorides, or mixtures thereof. However, the invention is particularly applicable to the dehydrohalogenation of alkyl chlorides.

Representative examples of applicable alkyl halides having 4 to 18 carbon atoms are:

1-chlorobutane
2-bromopentane
1-iodohexane
3-iodooctane
2-fluorononane
3-fluorooctane
1-chlorononane
1-chlorododecane
2-bromodecane
1-chloropentadecane
1-chlorooctadecane
1,4-dichlorobutane
1-chloro-3-methylbutane
1-bromo-4-methyloctane
2-chloro-5-ethyldodecane 1,3,5-trichlorodecane
1,3,4,7-tetrachlorotetradecane and the like.

Examples of some olefins which can be produced by the process of this invention include:

1-butene
2-pentene
1-hexene
3-octene
1-decene
2-dodecene
1-pentadecene
1-octadecene
3-methyl-1-butene
4-methyl-1-octene
5-ethyl-2-dodecene and the like.

The dehydrohalogenation process is conducted at a temperature of from about 150 to about 600° C., preferably within the range of about 250–450° C. The flow rate of the halogenated compound to be dehydrohalogenated over the catalyst, based on the halogenated compound in its liquid state, generally ranges from about 0.1–5, preferably about 0.3–3, volumes per volume of catalyst per hour. Although the reaction can be carried out in the liquid phase, it is preferably carried out in the vapor phase. The reaction pressure is ordinarily atmospheric or lower; however higher pressures, for example, up to about 100 p.s.i.g., can be employed. If desired, a non-reactive diluent such as nitrogen, or other inert gas, or a paraffinic hydrocarbon can be present.

The dehydrohalogenation process of the invention can be conducted as a batch or continuous process, utilizing either liquid phase or vapor phase operation. A preferred method of operation is to pass the volatilized alkyl halide through a bed of the borate-diatomaceous earth catalyst of my invention at a rate chosen to provide the desired degree of conversion with a high selectivity for the desired olefinic material. Unconverted material can be separated from the reaction zone effluent by conventional separation methods and recycled to the reaction zone. Furthermore, as activity of the catalyst decreases, operation at successively higher temperatures can be employed until regeneration of the catalyst is required.

In actual operation wherein the dehydrohalogenation process is conducted in the liquid phase, the dehydrohalogenation zone liquid effluent can be passed to a first distillation zone wherein dissolved hydrogen halide is separated from the liquid effluent. The liquid fraction comprising product olefin and unconverted alkyl halides can be passed from the first distillation zone to a second distillation zone wherein the product olefins are separated from the unconverted alkyl halides. The separated alkyl halides can be recycled to the dehydrohalogenation zone.

In carrying out the invention when the dehydrohalogenation process is conducted in the vapor phase, the dehydrohalogenation zone vapor effluent can be partially condensed to separate the hydrogen halide therefrom and the condensed liquid fraction pased to a distillation zone wherein the product olefins are separated from the unconverted alkyl halides.

EXAMPLE

The vapor-phase dehydrochlorination of a mixture of isomeric linear monochlorononanes was carried out in a tubular reactor under various catalytic conditions at atmospheric pressure and at temperatures ranging from 250° C. to 400° C. The liquid hourly space velocity (LHSV) of the monochlorononanes ranged from 0.57 to 1.1 volumes of liquid chlorides per volume of catalyst per hour. The catalysts containing an alkali metal tetraborate were prepared by treating crushed Celite 408 (3/16 in. pellets of diatomaceous earth from Johns-Manville Corp.), attapulgite, or Fuller's earth with the required amount of alkali metal tetraborate in sufficient water to thoroughly wet the Celite 408, attapulgite, or Fuller's earth, after which the water was removed by volatilization. The catalysts containing zinc borate, boron phosphate, or sodium hydroxide were prepared similarly. When lithium tetraborate or zinc borate was employed, sufficient hydrochloric acid was added to the aqueous mixture to achieve solution of the boron-containing compound; boron phosphate was added as a suspension to the Celite 408. The other alkali metal tetraborates and sodium hydroxide were used as their aqueous solutions. The effluent from the dehydrochlorination reactor was passed into water. After the effluent and water were thoroughly shaken to remove hydrogen chloride from the organic phase, the organic phase was separated and analyzed by gas chromatography. The reaction conditions and results are summarized in the following table, together with those for a non-catalyzed reaction. The liquid hourly space velocity of the monochlorononanes in the non-catalyzed reaction is given as volumes of liquid chlorides per volume of reactor per hour.

TABLE*

| Run No. | Catalyst | Temp., ° C. | LHSV, vol./vol./hr. | Conversion of $C_9H_{19}Cl$ | Selectivities, mole percent | | | |
|---|---|---|---|---|---|---|---|---|
| | | | | | Light Olefinic Products | Isoolefins | Linear Olefins | Other Products |
| 1 | None | 525 | 3.8 | 92.2 | 4.9 | 0 | 92.9 | 2.2 |
| 2 | Bentonite | 275 | 0.85 | 63.9 | 1.0 | 10.5 | 88.5 | 0 |
| 3 | Bauxite | 275 | 0.92 | 99.3 | 4.7 | 30.3 | 64.5 | 0.5 |
| 4 | Attapulgite | 275 | 0.95 | 99.5 | 8.1 | 34.5 | 56.2 | 1.2 |
| 5 | Fuller's earth | 250 | 1.1 | 99.5 | 1.0 | 28.3 | 69.4 | 1.3 |
| 6 | Celite 408 | 300 | 1.0 | 96.6 | 0 | 16.5 | 83.5 | 0 |
| 7 | Celite 408/10 wt. percent $Li_2B_4O_7$ | 275 | 0.96 | 75.5 | 0 | 0.3 | 99.7 | 0 |
| 8 | Celite 408/2.6 wt. percent $Na_2B_4O_7$ | 350 | 0.91 | 84.5 | 0 | 1.4 | 98.6 | 0 |
| 9 | Celite 408/5.3 wt. percent $Na_2B_4O_7$ | 250 | 0.75 | 81.1 | 0 | 0.6 | 99.4 | 0 |
| 10 | do | 350 | 0.89 | 94.2 | 0 | 0.6 | 99.4 | 0 |
| 11 | do | 400 | 0.57 | 90.8 | 0 | 0.9 | 98.5 | 0.6 |
| 12 | Celite 408/10.6 wt. percent $Na_2B_4O_7$ | 400 | 0.68 | 92.8 | 0 | 0.6 | 99.4 | 0 |
| 13 | Celite 408/5.3 wt. percent $K_2B_4O_7$ | 350 | 0.71 | 77.8 | 0 | 1.0 | 99.0 | 0 |
| 14 | do | 400 | 0.66 | 83.5 | 0 | 0.7 | 99.3 | 0 |
| 15 | Celite 408/7.6 wt. percent $K_2B_4O_7$ | 275 | 0.84 | 88.8 | 0 | 0 | 100 | 0 |
| 16 | Celite 408/10 wt. percent $Zn_3(BO_3)_2$ | 275 | 0.85 | 95.1 | 5.1 | 25.8 | 69.1 | 0 |
| 17 | Celite 408/10 wt. percent $BPO_4$ | 275 | 0.83 | 78.9 | 0 | 2.7 | 97.3 | 0 |
| 18 | Attapulgite/7.6 wt. percent $K_2B_4O_7$ | 250 | 0.80 | 98.8 | 3.5 | 41.8 | 53.4 | 1.3 |
| 19 | Fuller's earth/7.6 wt. percent $K_2B_4O_7$ | 250 | 0.79 | 97.3 | 0.4 | 14.8 | 83.3 | 1.5 |
| 20 | Celite 408/5.0 wt. percent NaOH | 400 | 0.72 | 99.6 | 0.7 | 22.7 | 74.6 | 2.0 |
| 21 | Celite 408/10 wt percent NaOH | 400 | 0.77 | 99.4 | 0.4 | 19.5 | 79.5 | 0.6 |

*The mixture of linear monochlorononanes used in runs 4, 5, 9, 15, 18, and 19 was made up of 95.4 weight percent secondary and 4.6 weight percent primary chlorides; in all other runs the mixture was made up of 86.4 weight percent secondary and 13.6 weight percent primary chlorides.

Runs 7–15 in the above table, according to the invention, demonstrate the high selectivity to linear olefins obtained by dehydrochlorination in the presence of an alkali metal tetraborate on Celite 408. Little or no cracking, skeletal isomerization, or other side reaction occurred. A comparison of runs 15–17 shows that use of other types of boron-containing compounds resulted in inferior selectivity to linear olefins. Runs 18 and 19 show that unsatisfactory selectivity was obtained when potassium tetraborate on attapulgite or Fuller's earth was used, and runs 20 and 21 demonstrate unsatisfactory selectivity when sodium hydroxide on Celite 408 was used. Runs 2–6 show that Celite 408 and related substances, when used alone, did not effect satisfactory selectivity to the desired linear olefins. Run 1 shows that unsatisfactory selectivity was obtained in the absence of a catalyst.

Reasonable variation and modification are possible within the scope of the foregoing disclosure and the appended claims to the invention, the essence of which is a process for dehydrohalogenating a halogenated compound to selectively produce the desired unsaturated compound at high conversion in the presence of a novel catalyst comprising an alkali metal borate and diatomaceous earth.

I claim:

1. A catalyst composition comprising an alkali metal salt of boric acid and diatomaceous earth.

2. A catalyst composition according to claim 1 wherein the amount of said alkali metal salt comprises about 0.5–30 weight percent of said catalyst.

3. A catalyst composition according to claim 1 wherein said alkali metal salt is sodium tetraborate.

4. A catalyst composition according to claim 1 wherein said alkali metal salt is potassium tetraborate.

5. A catalyst composition according to claim 1 wherein said alkali metal salt is lithium tetraborate.

6. A process for preparing aliphatically unsaturated hydrocarbons by dehydrohalogenation which comprises contacting a halogenated hydrocarbon compound with a catalyst composition comprising an alkali metal salt of boric acid and diatomaceous earth.

7. The process of claim 6 wherein the quantity of said alkali metal salt is in the range of 0.5 to 30 weight percent of said catalyst.

8. The process of claim 6 wherein the temperature of said contacting is conducted at a temperature in the range of about 150 to 600° C.

9. A process according to claim 6 for producing linear olefins with high selectivity and conversion wherein said halogenated hydrocarbon compound is an alkyl halide having from 4 to 18 carbon atoms per molecule.

10. A process according to claim 9 wherein said alkyl halide is monochloronane and wherein said alkali metal salt is selected from lithium tetraborate, sodium tetraborate, and potassium tetraborate.

References Cited

UNITED STATES PATENTS

| | | | |
|---|---|---|---|
| 2,285,294 | 6/1942 | Marks | 252—432 X |
| 2,708,210 | 5/1955 | Sias | 260—677 |
| 3,089,901 | 5/1963 | Vitcha et al. | 252—432 X |

DELBERT E. GANTZ, *Primary Examiner.*

G. E. SCHMITKONS, *Assistant Examiner.*